United States Patent [19]
Taylor et al.

[11] Patent Number: 5,452,087
[45] Date of Patent: Sep. 19, 1995

[54] METHOD AND APPARATUS FOR MEASURING PRESSURE WITH EMBEDDED NON-INTRUSIVE FIBER OPTICS

[75] Inventors: Henry F. Taylor; Robert A. Atkins, both of College Station; William N. Gibler, Bryan; Chung-Eun Lee, College Station; James J. McCoy, Spring; Matthew O. Spears, Bryan; Mark D. Oakland, Bryan; Victor P. Swenson, Bryan, all of Tex.; Gregory M. Beshouri, Berkeley, Calif.

[73] Assignees: The Texas A & M University System, College Station, Tex.; American Gas Association, Arlington, Va.

[21] Appl. No.: 147,830

[22] Filed: Nov. 4, 1993

[51] Int. Cl.$^6$ ................................. G01B 9/02
[52] U.S. Cl. ..................... 356/352; 356/345; 356/355; 250/227.19; 385/12
[58] Field of Search ............ 356/345, 352, 35.5; 250/227.14, 227.19; 385/12, 14

[56] References Cited

U.S. PATENT DOCUMENTS

| | | |
|---|---|---|
| 4,119,363 | 10/1978 | Camlibel et al. |
| 4,345,816 | 8/1982 | Nakai et al. |
| 4,360,247 | 11/1982 | Beasley ............... 250/227.14 |
| 4,653,846 | 3/1987 | Yamazaki et al. |
| 4,657,346 | 4/1987 | Berry et al. |
| 4,848,999 | 7/1989 | Taylor .................... 65/4.3 |
| 4,891,640 | 1/1990 | Ip ........................ 340/853 |
| 4,904,046 | 2/1990 | Paschke et al. |
| 4,948,406 | 8/1990 | Kornmann ............. 68/3.11 |
| 5,091,987 | 2/1992 | MacCulloch et al. ....... 385/66 |
| 5,127,083 | 6/1992 | Ikeda et al. ............. 385/138 |
| 5,194,847 | 3/1993 | Taylor et al. ............ 340/557 |
| 5,283,852 | 2/1994 | Gibler et al. ............ 385/136 |

OTHER PUBLICATIONS

C. E. Lee, et al., "Interferometric Optical Fibre Sensors Using Internal Mirrors," *Department of Electrical Engineering, Texas A&M University*, Oct. 12, 1987.
C. E. Lee, et al., "Performance of a Fiber-Optic Temperature Sensor from −200 to 1050° C.," *Optics Letters*, vol. 13, No. 11, Nov., 1988, pp. 1038–1040.
Jorge J. Alcoz, et al., "Embedded Fiber-Optic Fabry-Perot Ultrasound Sensor," *IEEE Transactions on Ultrasonics, Ferroelectrics, and Frequency Control*, vol. 37, No. 4, Jul., 1990, pp. 302–306.
Chung E. Lee, et al., "In-Line Fiber Fabry-Perot Interferometer with High-Reflectance Internal Mirrors," *Journal of Lightwave Technology*, vol. 10, No. 10, Oct., 1992, pp. 1376–1379.
C. E. Lee, et al., "Metal-Embedded Fiber Optic Fabry-Perot Sensors," 1991 *Optical Society of America*, Dec. 15, 1991, vol. 16, No. 24, pp. 1990–1992, reprint from *Optics Letters*.

*Primary Examiner*—Samuel A. Turner
*Assistant Examiner*—Amanda H. Park
*Attorney, Agent, or Firm*—Baker & Botts

[57] ABSTRACT

A method and apparatus is provided for measuring pressure in a pressure containing vessel with a non-intrusive, metal-embedded fiber optic pressure sensor. The pressure containing vessel may, for example, be the combustion chamber of an internal combustion engine. A Fabry-Perot Interferometer is arranged in a terminated, single mode fiber to function as a strain gauge. The fiber Fabry-Perot Interferometer (FFPI) is embedded in a metal part which may be disposed in a wall of the pressure containing vessel. The metal part and FFPI experience a longitudinal strain in response to the pressure in the vessel. In another aspect of the invention, a non-intrusive fiber containing the FFPI may be embedded along the axis of a metal bolt. The bolt may be used to attach a part or structure, which is directly exposed to the pressure, to the wall of the vessel. Consequently, the bolt and FFPI experience a longitudinal strain in response to the pressure on the part or structure. In this aspect, the part or structure exposed to the pressure may be, for example, a fuel injection valve that is attached by the bolt to a cylinder head of an internal combustion engine.

8 Claims, 2 Drawing Sheets

METHOD AND APPARATUS FOR MEASURING PRESSURE WITH EMBEDDED NON-INTRUSIVE FIBER OPTICS

CROSS REFERENCE TO RELATED APPLICATION

This Application is related by subject matter to commonly-assigned, copending U.S. patent application Ser. No. 08/147029 (Attorney Docket No. 17575-0155), which is incorporated herein by reference.

TECHNICAL FIELD OF THE INVENTION

This invention relates in general to the field of fiber optics. More particularly, the present invention relates to a method and apparatus for measuring the pressure inside a containment vessel or chamber using a fiber optic sensor.

BACKGROUND OF THE INVENTION

Ever since the introduction of fiber optics technology, the optical fiber has proven to be a versatile and relatively efficient means of transporting light energy and information. For example, optical fibers are used in the medical field to transport laser energy through flexible catheters for pin-point microsurgery, or in the telecommunications field to transport data for long distances at very high rates. More recently, developments in fiber optics technology have spurred considerable research on the use of optical fibers as pressure or strain sensors.

The need for improved pressure sensors has been widely recognized in the research and development community. For example, spring-activated pressure gauges have been used in the automotive industry to measure dynamic pressures in automobile and truck engines. In one application, a port in a cylinder wall or head of an engine is provided for pressure measurements. Gas exiting the combustion chamber through the port passes through a metal tube to the spring-activated gauge. However, spring-activated pressure sensing devices do not operate reliably at high temperatures. Consequently, the device must be located remotely from the combustion chamber, which reduces the response time of the sensor and introduces measurement errors due to acoustical effects and pressure drops in the elongated tube. The relatively slow response of such sensors limits their utility to average pressure measurements, and the resulting measurement errors reduce the accuracy and reliability of the measurement data.

More accurate pressure readings, with acceptable time resolutions, have been provided by using piezoelectric transducers as sensors. In a conventional application, a piezoelectric transducer is mounted in a special port, typically in the cylinder head of an engine. Two types of such transducers may be used. In one type, the piezoelectric element is exposed directly to the pressure in the combustion chamber. In the other type of transducer, a piston is located between the chamber and the piezoelectric element. Consequently, the element responds to the displacement of the piston and only indirectly to the pressure in the chamber. A disadvantage of piezoelectric transducers is that they must be cooled with recirculating water or air because of their vulnerability to the high temperature environment in which they must operate. Nevertheless, even with optimum cooling, piezoelectric transducers must be frequently recalibrated, their operating life is relatively short, and the sensors are relatively expensive. Generally, piezoelectric pressure sensors have proven useful for engine research and development, but due to their limitations, they have not been widely incorporated into engine products.

Recent advances in embedding optical fibers in metals have spurred the development of fiber optic pressure sensors. For example, commonly-assigned U.S. patent application Ser. No 07/926,756 (Attorney Docket No. 17575-0135) describes a novel technique for embedding optical fibers in metals, by using stress-relieving tubes at the air-metal interfaces of the fibers. Previous attempts to embed optical fibers in metals had all resulted in failure. Even more particularly, however, Vol. 16, No. 24 of *Optics Letters.*, Dec. 15, 1991, pp. 1990-92, describes the sensing of temperature and ultrasonic pressure with fiber optic Fabry-Perot interferometers embedded in aluminum parts. Breakage of the fibers at the air-metal interface during the embedding process is avoided through the use of stainless-steel stress-relief tubes. However, these fibers are fed completely through the aluminum part, which may be useful for monitoring temperature and strain in aluminum structures such as aircraft wings, but prohibitive in applications where the sensor must not be intrusive, such as, for example, monitoring pressure inside the combustion chamber of an engine. Therefore, it follows that if a non-intrusive, metal-embedded fiber optic pressure sensor were possible, then the problems encountered with spring-activated gauges and piezoelectric pressure sensors would be overcome.

SUMMARY OF THE INVENTION

In accordance with the present invention, a method and apparatus are provided for measuring pressure differences across a mechanical barrier with fiber optics which substantially eliminate or reduce disadvantages and problems associated with prior methods and apparatuses.

In one aspect of the present invention, a method and apparatus for measuring positive or negative pressure in a pressure containing vessel is provided with a non-intrusive, metal-embedded fiber optic pressure sensor. A Fabry-Perot Interferometer is arranged in a terminated, single mode fiber to function as a strain gauge. The fiber Fabry-Perot Interferometer (FFPI) is embedded in a metal casing which is disposed in a wall of the pressure containing vessel. The metal casing and FFPI experience a longitudinal strain in response to the pressure in the vessel.

In another aspect of the invention, a non-intrusive fiber containing the FFPI is embedded in a hole drilled or otherwise provided along the axis of a metal bolt. The bolt is threaded into the cylinder head of an engine and used to attach a fuel injector valve, which is directly exposed to the combustion chamber pressure, to the head. Consequently, the bolt and FFPI experience a longitudinal strain in response to the pressure in the chamber.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The preferred embodiments of the present invention and their advantages are best understood by referring to FIGS. 1 through 5 of the drawings, like numerals being used for like and corresponding parts of the various drawings.

Figure 1:
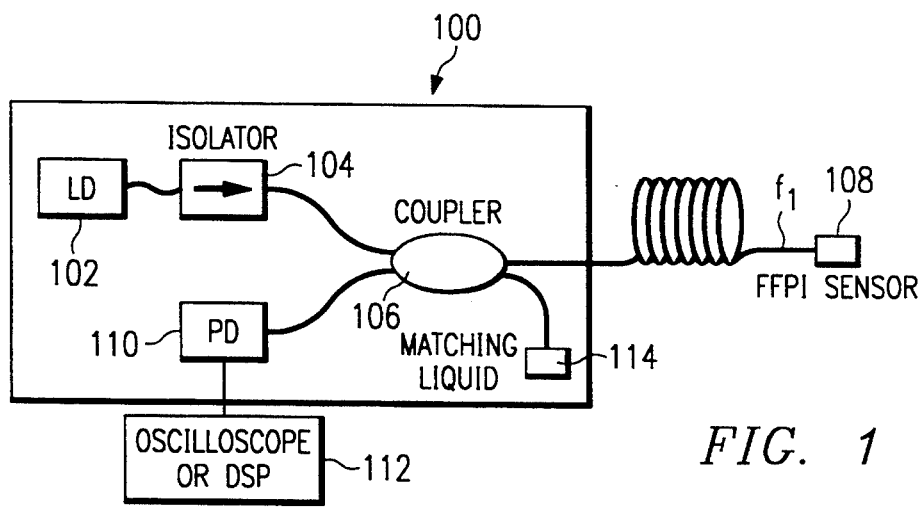
FIG. 1 is a simplified schematic of a pressure monitoring system using a non-intrusive, embedded fiber optic pressure sensor constructed in accordance with the present invention.

With reference to the drawings, FIG. 1 shows a simplified schematic of a pressure monitoring system using a non-intrusive, embedded fiber optic pressure sensor constructed in accordance with the invention. Pressure monitoring system 100 includes single mode laser source 102, which may be a semiconductor laser diode, a solid state laser such as a neodymium yttrium aluminum garnet (ND:YAG) laser, or other lasers that produce a suitably narrow spectral line. In a preferred embodiment, laser source 102 is a continuously operating, 1.3 μm semiconductor laser diode. The temperature of the laser heat sink may be controlled with a thermoelectric cooler and monitored with a thermistor. The light from laser source 102 is coupled into single mode optical fiber f1, which is generally depicted by the solid line connected between the components of system 100. The coherent light from laser source 102 is passed through optical isolator 104, which functions to prevent destabilization of the laser's spectral purity due to optical feedback from the rest of the system. The light from optical isolator 104 is split into two equal-amplitude components in fiber coupler 106. One component of the light is coupled to embedded FFPI 108, while the second component is terminated in impedance matching liquid device 114. Responsive to a sensed pressure, a portion of the first component of light is reflected from embedded FFPI 108 and passed through fiber coupler 106 to photosensitive detector 110. Photosensitive detector 110 may be, for example, an InGaAs semiconductor photodiode or any suitable detector having similar functional capabilities as detector 110. Photosensitive detector 110 converts the detected light energy into an electrical signal which is displayed on oscilloscope or digital signal processor 112.

Figure 2:
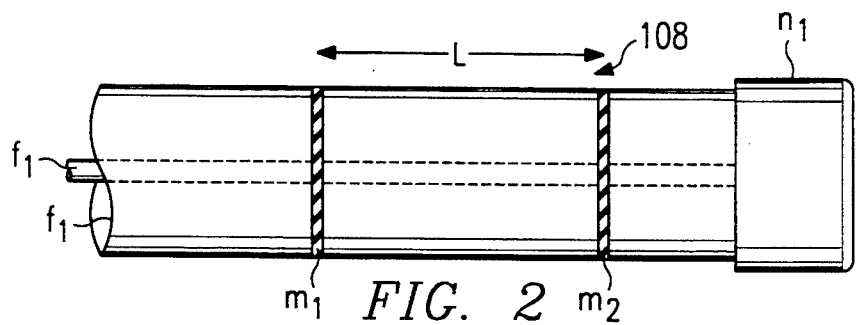
FIG. 2 is a side view of a terminated, fiber Fabry-Perot Interferometer constructed in accordance with the invention.

FIG. 2 is a side view of a terminated, fiber Fabry-Perot Interferometer constructed in accordance with the invention. The pressure to be displayed or otherwise recorded is provided by the optical signal from the FFPI, which may function as a highly sensitive strain transducer. FFPI 108 comprises internal mirrors m1 and m2 separated by length L of fiber f1. Each mirror m1 and m2 is produced by a known process of vacuum depositing a thin film of dielectric material $TiO_2$ on a cleaved end of fiber f1. Fiber f1 consists of a fiber core combined with a cladding of lower refractive index to form an optical waveguide. Although the fiber core in FIG. 2 is depicted as being surrounded by cladding, it is for illustrative purposes only, and the core and cladding materials are typically combined to form a single, mechanical entity. In one aspect of the invention, nonreflective termination n1 is provided to minimize back-reflections and thus terminate the transmitted signal. The end of fiber f1 may be terminated by cleaving or polishing the fiber at a predetermined angle selected specifically to minimize back-reflections, or by breaking the fiber in such a manner that the surface is a poor reflector. A novel fusion splicing technique, which is described in U.S. Pat. No. 4,848,999, and incorporated herein by reference, is used to incorporate mirrors m1 and m2 into a continuous length of the fiber. The reflectance R for each of mirrors m1 and m2 is selected to fall within the 2-12% range.

The reflectance of the FFPI is a function of the optical path length nL of the interferometer, where n is the effective refractive index of the guided mode of the fiber. Consequently, a longitudinal strain (i.e., change in L) affects the fraction of the incident optical power which is reflected by the FFPI. By measuring this reflected optical power at display 112, the magnitude or value of the strain may be determined. Only changes that affect the fiber in the region between mirrors m1 and m2 are sensed. Assuming that the induced change of nL in FFPI 108 is proportional to the pressure P in a pressure containment vessel, then the round trip phase shift of the reflected signal φ is given by:

$$\phi \approx \phi_0 + KP \qquad (1)$$

where $\phi_0$ is the round trip phase shift of the reflected signal at zero pressure, and K is a constant that is determined by the sensor's configuration. By measuring this phase shift, the magnitude of the longitudinal strain (change in L) experienced by the sensor and, therefore, the pressure in the vessel may be determined.

Figure 3:
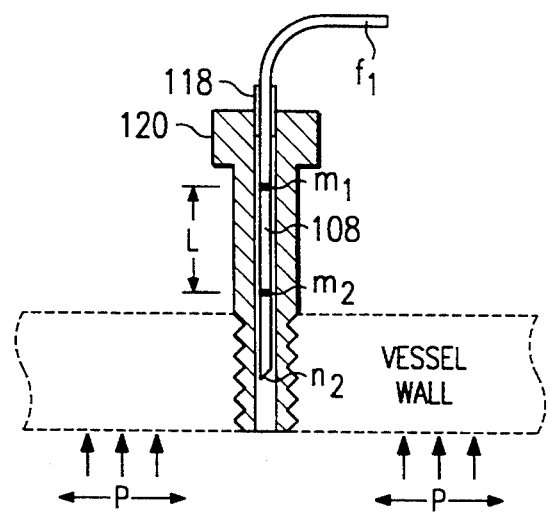
FIG. 3 is a cross-sectional view of a non-intrusive, embedded fiber optic pressure sensor constructed in accordance with an embodiment of the present invention.

FIG. 3 is a cross-sectional view of a non-intrusive, embedded fiber optic pressure sensor constructed in accordance with a preferred embodiment of the present invention. Using a form of the embedding technique described in U.S. patent application Ser. No. 07/926,756 (Attorney Docket No. 17575-0135), which is incorporated herein by reference, FFPI 108 is embedded along the axis of metal part 120. Metal part 120 may be, for example, a bolt, metal rod, or other appropriate part that has been machined and threaded so that it can be screwed or fastened into a larger structure, such as a wall of a pressurized vessel. Fiber f1 including FFPI 108 is passed through stress-relieving tube 118, which is positioned at the top opening in metal part 120. Tube 118 may be constructed of metals, such as stainless steel, or ceramic or other suitable materials, and functions to prevent breakage of the fiber during the embedding process and also provide strain relief in the finished part. The size of the opening in metal part 120 is such that it permits stress-relieving tube 118 to be inserted therethrough, but to leave a minimal gap between the top opening and the outer surface of tube 118 so that molten metal cannot escape therethrough. In addition, the inside diameter of tube 118 is such that it accommodates optical fiber f1 and FFPI 108 and yet minimizes the entry of molten metal. In a preferred embodiment, the metal part containing the embedded FFPI may be produced by a casting process in which molten aluminum alloy 356 (92.7% Al, 7.0% Si, 0.3% Mg) is poured into a mold into which the FFPI extends. Aluminum, other aluminum alloys, alloys of brass or other metals, or other suitable materials such as, for example, ceramics, may be substituted for aluminum alloy 356. The only constraint for the purpose of embedding optical fibers is the melting temperature of the metal or other material used. The melting point of the molten material to be poured should be less than that of fiber f1, which is approximately 1600° C. for glass fibers and over 2000° C. for sapphire fibers. The molten material is allowed to cool to or near room temperature before moving the resultant embedded sensor. If necessary, the metal part containing the FFPI may be machined to desired specifications. An end of metal part 120 is directly exposed to the pressurized environment inside the vessel. The vessel may contain a gas or liquid. Importantly, neither metal part 120 nor the embedded fiber sensor intrude into the vessel. Pressure in the vessel produces an axial strain in metal part 120, which is also experienced by the embedded fiber sensor. The resulting change in the length L produces a proportional change in the reflected energy from FFPI 108. The pressurized vessel may contain a positive pressure such as, for example, the pressure produced by combustion, or a negative pressure such as a vacuum. Constructed in this manner, optical signals from laser source 102 may be coupled via fiber f1 to FFPI 108, and the signals reflected by FFPI 108 may be received and analyzed at display 112. Signals passing through FFPI 108 may be terminated by termination n2. Although the fiber sensor shown in FIG. 3 is embedded in a metal part, which may be affixed in a wall of a pressure containment vessel, it would be within the scope of the invention to embed the fiber sensor directly in the wall of the vessel, assuming that the wall is constructed of a suitable material.

Figure 4:
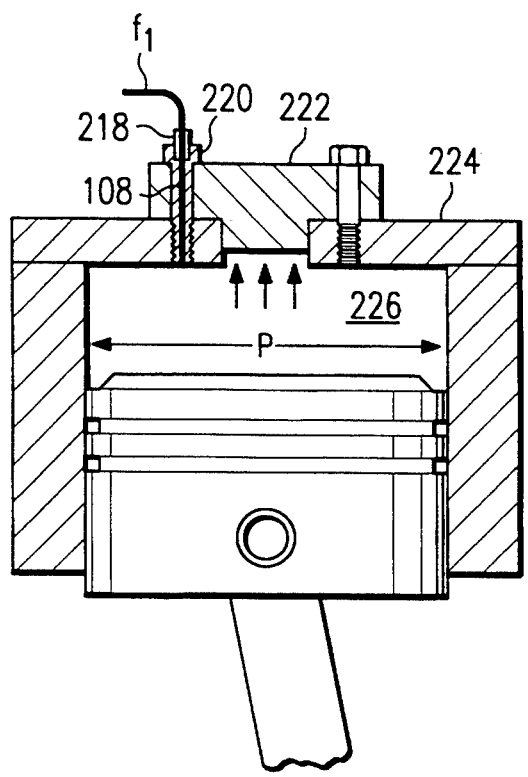
FIG. 4 is a cross-sectional view of a non-intrusive, embedded fiber optic pressure sensor disposed in a cylinder head of a combustion engine in accordance with a second embodiment of the invention.

FIG. 4 is a cross-sectional view of a non-intrusive, embedded fiber optic pressure sensor disposed in a cylinder head of a combustion engine in accordance with a second embodiment of the invention. Using the embedding technique described above, FFPI 108 is passed through strain-relief tube 218 and embedded with a suitable material in a hole drilled or otherwise formed along the axis of bolt 220. In a broader aspect of this embodiment, bolt 220 may be used to attach any appropriate part or structure, which is directly exposed to the pressure in a containment vessel, to the wall of the vessel. Consequently, the bolt and FFPI experience a longitudinal strain in response to the pressure on the part or structure. For example, in the aspect of FIG. 4, bolt 220 may be used to attach fuel injector valve 222 to cylinder head 224 of an engine (not explicitly shown). Fuel injector valve 222 is directly exposed to the pressure P in combustion chamber 226. Bolt 220 and FFPI 108 experience a longitudinal strain in response to pressure P transferred from valve 222. The reflected energy from FFPI 108 is then received and analyzed at display 112 of FIG. 1.

Figure 5:
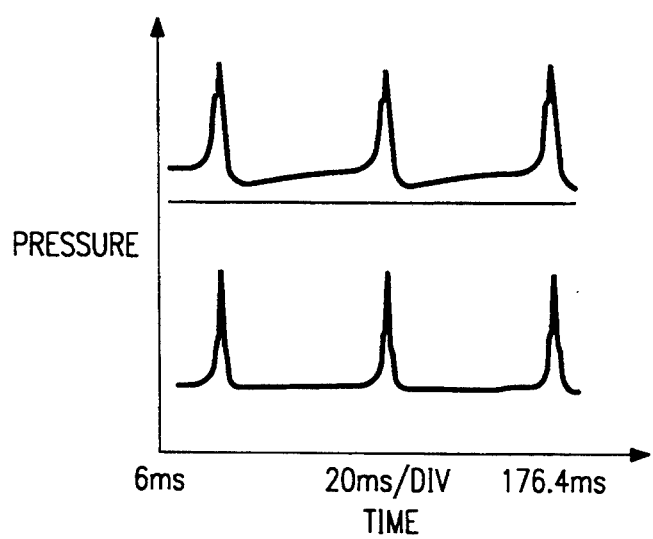
FIG. 5 is a graphical depiction comparing exemplary output signals from a conventional piezoelectric pressure sensor and a fiber optic pressure sensor constructed in accordance with the invention.

FIG. 5 is a graphical depiction comparing exemplary output signals from a conventional piezoelectric pressure sensor monitoring combustion chamber pressure in a diesel engine, and the fiber optic pressure sensor of the invention as illustrated in FIG. 4. The top trace in FIG. 5 is the response of the conventional sensor, and the bottom trace is the response of the FFPI, non-intrusively embedded in a bolt used to hold down the fuel injector valve. The signal responses to pressure are close. However, the conventional sensor must be water-cooled or air-cooled to obtain such a response at high temperatures, thus increasing the complexity and cost of the conventional sensors compared with sensors constructed in accordance with the invention. In fact, fiber optic sensors constructed in accordance with the invention may operate continuously at temperatures above 1000° C. while the maximum allowable temperature for operating uncooled, piezoelectric pressure sensors is 250° C.

Although the present invention has been described in detail, it should be understood that various changes, substitutions and alterations can be made thereto without departing from the spirit and scope of the present invention as defined by the appended claims.

What is claimed is:

1. Apparatus for measuring pressure in a vessel containing a gas or liquid, comprising:
    a first metallic member which is deployed in contact with an external wall of said vessel and exposed to said gas or liquid through an aperture in said wall;
    a second metallic member having a first end attached to said wall of said vessel and contacting said first metallic member in such a manner as to hold said first metallic member in firm contact with said external wall of said vessel; and
    a fiber optic sensor embedded in said second metallic member wherein one end of said fiber optic sensor terminates in said second metallic member, said fiber optic sensor operable to experience a strain responsive to a pressure in said vessel.

2. The apparatus of claim 1, wherein said fiber optic sensor includes a Fabry-Perot Interferometer.

3. The apparatus of claim 1, wherein said second metallic member comprises a metal bolt which is attached to said wall of said vessel by screwing into a threaded hole in said wall.

4. The apparatus of claim 1, wherein said vessel comprises a combustion chamber in a cylinder of an internal combustion engine.

5. The apparatus of claim 1, wherein said first metallic member comprises a fuel injector valve of an internal combustion engine.

6. The apparatus of claim 1, wherein said pressure comprises a negative pressure.

7. A method of measuring pressure in a pressure containing vessel, comprising the steps of:
    positioning a first metallic member to cover and seal an aperture in a wall of said pressure containing vessel;
    embedding a fiber optic sensor in a second metallic member wherein one end of said fiber optic sensor terminates in said second metallic member;
    attaching a first end of said second metallic member to a wall of said pressure containing vessel, said second metallic member contacting said first metallic member in such a manner as to hold said first metallic member in firm contact with an exterior of said wall of said vessel;
    sensing a strain in said fiber optic sensor responsive to a pressure in said pressure containing vessel; and
    generating an optical signal responsive to said strain.

8. The method of claim 7, wherein the embedding and sensing steps further comprise the steps of:
    embedding a fiber Fabry-Perot Interferometer in said second metallic member; and
    sensing a strain in said fiber Fabry-Perot Interferometer responsive to a pressure in said pressure containing vessel.

* * * * *